(12) United States Patent
Moon et al.

(10) Patent No.: US 7,515,892 B2
(45) Date of Patent: Apr. 7, 2009

(54) BASE STATION ANTENNA SYSTEM AND METHOD FOR ESTIMATING MOBILE STATION DIRECTION IN WIRELESS COMMUNICATION SYSTEM

(75) Inventors: Sung-Hoon Moon, Suwon-si (KR); Jae-Young Jang, Yongin-si (KR); Chung-Kyun Ham, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 605 days.

(21) Appl. No.: 11/319,934

(22) Filed: Dec. 28, 2005

(65) Prior Publication Data

US 2006/0148525 A1 Jul. 6, 2006

(30) Foreign Application Priority Data

Dec. 31, 2004 (KR) .................. 10-2004-0118326

(51) Int. Cl.
*H04B 1/06* (2006.01)
(52) U.S. Cl. .................. 455/273; 455/25; 455/63.4; 455/137; 455/177.1; 375/242; 375/260; 370/345; 370/334
(58) Field of Classification Search .................. 455/273, 455/25, 63.4, 137, 177.1, 450, 562, 562.1, 455/63.1; 375/242, 260, 340; 370/345, 334, 370/337, 327
See application file for complete search history.

(56) References Cited

U.S. PATENT DOCUMENTS

| | | | |
|---|---|---|---|
| 5,903,238 A * | 5/1999 | Sokat et al. .................. 342/365 |
| 6,347,234 B1 * | 2/2002 | Scherzer .................. 455/562.1 |
| 6,377,812 B1 * | 4/2002 | Rashid-Farrokhi et al. .. 455/522 |
| 6,640,087 B2 * | 10/2003 | Reed et al. .................. 455/11.1 |
| 6,697,642 B1 * | 2/2004 | Thomas .................. 455/562.1 |
| 6,771,988 B2 * | 8/2004 | Matsuoka et al. ......... 455/562.1 |
| 6,791,967 B1 * | 9/2004 | Ishida ........................ 370/345 |
| 7,010,281 B2 * | 3/2006 | Ukena et al. .............. 455/127.1 |
| 7,031,719 B2 * | 4/2006 | Miyano et al. ........... 455/452.1 |
| 7,047,046 B2 * | 5/2006 | Hoffmann et al. ......... 455/562.1 |
| 2008/0026797 A1 * | 1/2008 | Nanda et al. .............. 455/562.1 |

\* cited by examiner

*Primary Examiner*—Minh D Dao
(74) *Attorney, Agent, or Firm*—The Farrell Law Firm, PC (57) ABSTRACT

Disclosed is an operation method of a base station antenna system, which includes receiving signals from at least two antennas to which a mono-pulse scheme has been applied; operating sum channel weight vectors for increasing a gain of signals incident to a specific direction and difference channel weight vectors for causing a gain of signals incident to a specific direction to be zero; applying the sum channel weight vectors and the difference channel weight vectors to the received signals, and outputting predetermined signals; and obtaining beam patterns of a sum channel and a difference channel, to which the weight vectors have been applied, by means of a direction of interest, calculating a mono-pulse ratio by means of the beam patterns, and estimating the direction of a mobile station by means of the mono-pulse ratio, and output of the sum channel and output of the difference channel to which the weight vectors have been applied.

14 Claims, 8 Drawing Sheets

BASE STATION ANTENNA SYSTEM AND METHOD FOR ESTIMATING MOBILE STATION DIRECTION IN WIRELESS COMMUNICATION SYSTEM

PRIORITY

This application claims priority to an application entitled "Base Station Antenna System and Method for Estimating Mobile Station Direction in Wireless Communication System" filed in the Korean Intellectual Property Office on Dec. 31, 2004 and assigned Ser. No. 2004-118326, the contents of which are incorporated herein by reference.

BACKGROUND OF THE INVENTION

1. Field of the Invention

The present invention relates to a wireless communication system, and more particularly to a system and method which have applied a mono-pulse scheme to a base station antenna with a circular array structure for estimating the direction of a mobile station.

2. Description of the Related Art

Typically, an antenna facilitates communication by a terminal by implementing conversion between electrical signals expressed by voltage and electric current and electromagnetic signals expressed by electric field and magnetic field. A wireless communication system for performing communication by employing the antenna as described above performs the communication through the air instead of via wire line. In other words, an antenna transmits and receives electromagnetic signals within its special boundaries, and performs an inter-conversion with electrical signals.

A wireless communication system includes a plurality of base stations for providing service to service areas with predetermined sizes, and a plurality of mobile stations for receiving the service from the base station. The wireless communication system exchanges data between the base station and the mobile station by means of the antenna. The base station divides and uses its own service area, i.e. a cell, according to a transitional plan, etc., in order to reduce interference and to delay increasing the base station's service area containing large traffic flow. For example, the base station uses a service area divided into sectors at an angle of 120°, 60° or 45°. Hereinafter, a wireless communication system in which each two of six antennas are assigned to each of three 120° sectors will be described with reference to FIG. 1.

Figure 1:
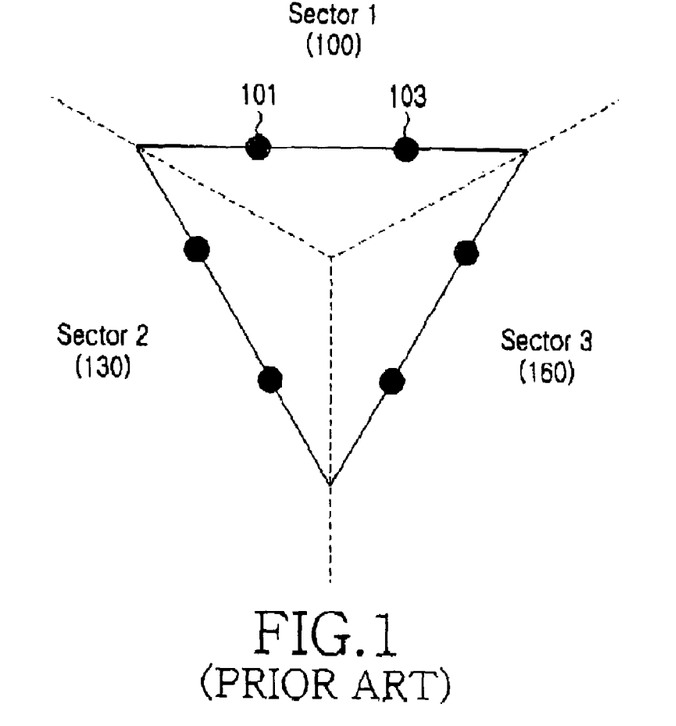
FIG. 1 is a diagram schematically illustrating an antenna structure with three sectors in a base station of a general wireless communication system.

FIG. 1 is a diagram schematically illustrating an antenna structure with three sectors in a base station of a general wireless communication system.

Referring to FIG. 1, the wireless communication system uses six antennas as illustrated in FIG. 1 in order to divide an entire cell into three sectors. That is, the cell of the base station is divided with an angle of 120° so as to generate three sectors, i.e. a first sector 100, a second sector 130 and a third sector 160. Each of the sectors uses two antennas and the antenna is a directional antenna. The first sector 100 includes two directional antennas 101 and 103. The directional antennas 101 and 103 represent antennas designed to have directivity and comprise wireless antennas for forming a beam only in a specific azimuth angle. Typically, the directional antenna has a reflector attached to a rear portion of an isotropic antenna, thereby causing electromagnetic waves to propagate only in a constant direction. The first sector 100 has the same structure as those of the second sector 130 and the third sector 160, and performs the same operation as those of the second sector 130 and the third sector 160. As a result, the antenna system with three sectors divides an entire cell into three sectors, provides separate directional antennas in each sector, and communicates with mobile stations.

However, when the base station antenna as described above is used, it is impossible to estimate or find out the location of a mobile station existing in a cell of the base station.

When a service area changes according to movement of a mobile station, the base station performs handover in order to continuously maintain the current communication channel. If handover is performed between sectors of the same base station, the base station and the mobile station perform the handover while exchanging information between themselves. The base station understands a sector, through which the base station communicates with the mobile station, by means of the inter-sector handover method as described above. Further, when the handover method as described above is used, information is exchanged between the mobile station and the base station. However, much time is required during handover due to the information exchange as described above.

The wireless communication system designs the structure of the base station sector. However, the directivity of the directional antenna in each sector has been fixed according to the initially designed structure of the sector. Therefore, it is impossible to freely adjust the directivity of the antenna. In addition, the base station using the antenna cannot freely adjust beam patterns of the antenna for sectoring.

In each sector of the wireless communication system, two antennas are horizontally installed at a distance greater than several wavelengths apart from each other in order to perform independent reception. Therefore, it is possible to obtain space diversity. However, the base station antenna must have a size designed to accommodate the intervals between the antennas.

SUMMARY OF THE INVENTION

Accordingly, the present invention has been made to solve the above-mentioned problems occurring in the prior art, and it is an object of the present invention to provide a system and a method applying a mono-pulse scheme to a base station antenna with a circular array structure.

It is another object of the present invention to provide a system and a method for a base station antenna with a circular array structure, to estimate the direction of a mobile station through an antenna beam.

It is further another object of the present invention to provide a system and a method applying a mono-pulse scheme to a base station antenna with a circular array structure, thereby performing inter-sector handover at high speed.

It is still another object of the present invention to provide a system and a method, which can freely adjust beam patterns of an antenna for sectoring of a base station.

In order to accomplish the aforementioned object, according to one aspect of the present, there is provided an operation method of a base station antenna system for dividing a cell of a base station into at least one sector, providing a communication service to a mobile station in the cell, and estimating a direction of the mobile station in a wireless communication system, the operation method including receiving signals from at least two antennas to which a mono-pulse scheme has been applied; operating sum channel weight vectors for increasing a gain of signals incident to a specific direction and difference channel weight vectors for causing a gain of signals incident to a specific direction to be zero; applying the sum channel weight vectors and the difference channel weight vectors to the received signals, and outputting predetermined signals; and obtaining beam patterns of a sum channel and a difference channel, to which the weight vectors have been applied, by means of a direction of interest, calculating a mono-pulse ratio by means of the beam patterns, and estimating the direction of the mobile station by means of the mono-pulse ratio, and output of the sum channel and output of the difference channel to which the weight vectors have been applied.

In order to accomplish the aforementioned object, according to another aspect of the present, there is provided a base station antenna system for dividing a cell of a base station into at least one sector, providing a communication service to a mobile station in the cell, and estimating a direction of the mobile station in a wireless communication system, the base station antenna system including at least two antennas with a circular array structure for receiving signals from the mobile station, each of the antennas employing a mono-pulse scheme; a sum channel combiner for generating sum channel weight vectors in order to increase a gain of signals incident to a specific direction, applying the sum channel weight vectors to the signals received from the antennas, and outputting predetermined signals; a difference channel combiner for generating difference channel weight vectors in order to cause a gain of signals incident to a specific direction to be zero, applying the difference channel weight vectors to the signals received from the antennas, and outputting predetermined signals; and an incident angle estimator for obtaining beam patterns of a sum channel and a difference channel by means of a direction of interest, calculating a mono-pulse ratio by means of the beam patterns, and estimating the direction of the mobile station by means of the mono-pulse ratio, output of the sum channel combiner, and output of the difference channel combiner.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

A preferred embodiment of the present invention will be described in detail herein below with reference to the accompanying drawings. In the following description, a detailed description of known functions and configurations incorporated herein will be omitted when it may obscure the subject matter of the present invention.

Figure 2:
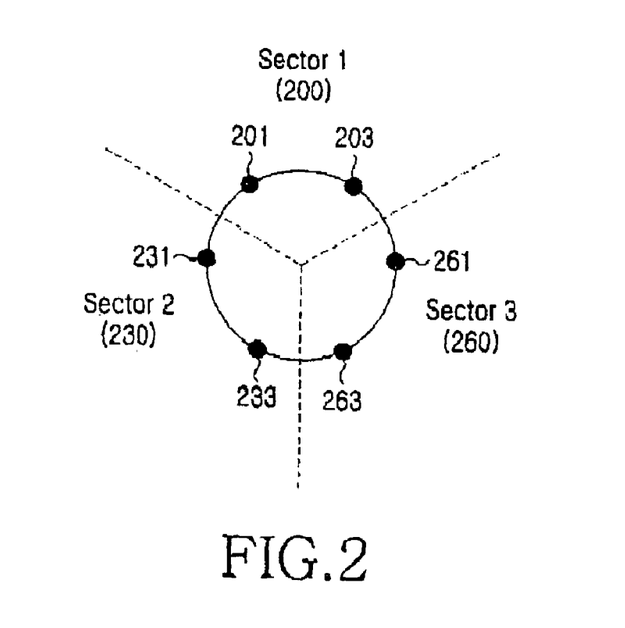
FIG. 2 is a diagram schematically illustrating an antenna structure with three sectors of a base station which uses a circular array antenna in a wireless communication system according to an embodiment of the present invention.

FIG. 2 is a diagram schematically illustrating an antenna structure with three sectors of a base station which uses a circular array antenna in a wireless communication system according to an embodiment of the present invention.

Referring to FIG. 2, the antenna in the wireless communication system of the present invention uses six antennas in order to divide an entire cell into three sectors. That is, the cell of the base station is divided with an angle of 120° so as to generate three sectors, i.e. a first sector 200, a second sector 230 and a third sector 260. An antenna beam in each sector is determined by a scheme for combining an output of an array antenna having an array structure as illustrated in FIG. 2, differently from an antenna system used in an existing base station. In FIG. 2, the first sector 200, the second sector 230 and the third sector 260 include antennas 201 and 203, antennas 231 and 233, antennas 261 and 263, respectively, and each of the three sectors 200, 230 and 260 has a circular array antenna structure. Further, a mono-pulse scheme has been applied to the antennas.

The array antenna increases output of signals incident to a specific direction of each antenna by means of a phase converter, thereby freely adjusting the entire directivity of an antenna beam. Accordingly, the array antenna of the base station forms a main beam in a direction of a user who wants communication, so that reception-desired signals are received at a high level while interference signals are received at a low level. The present invention applies a mono-pulse scheme to the array antenna having the circular structure. The mono-pulse scheme estimates an incident angle of target signals by means of two or more antenna beam patterns. Differently from a sequential lobing scheme or a conical scan scheme for estimating an incident angle of a target by receiving a plurality of continuous pulses through antenna beams oriented in different directions and analyzing the received signals in each direction, the mono-pulse scheme simultaneously receives reflected waves from the target through a plurality of antenna beams. Moreover, the mono-pulse scheme can estimate the direction of a target in each Pulse Repetition Interval (PRI). Consequently, the mono-pulse scheme can track the exact direction of the target which quickly changes. An antenna structure of a base station to which the mono-pulse scheme has been applied and a process for estimating a direction of a mobile station will be described with reference to FIGS. 3 and 4.

Figure 3:
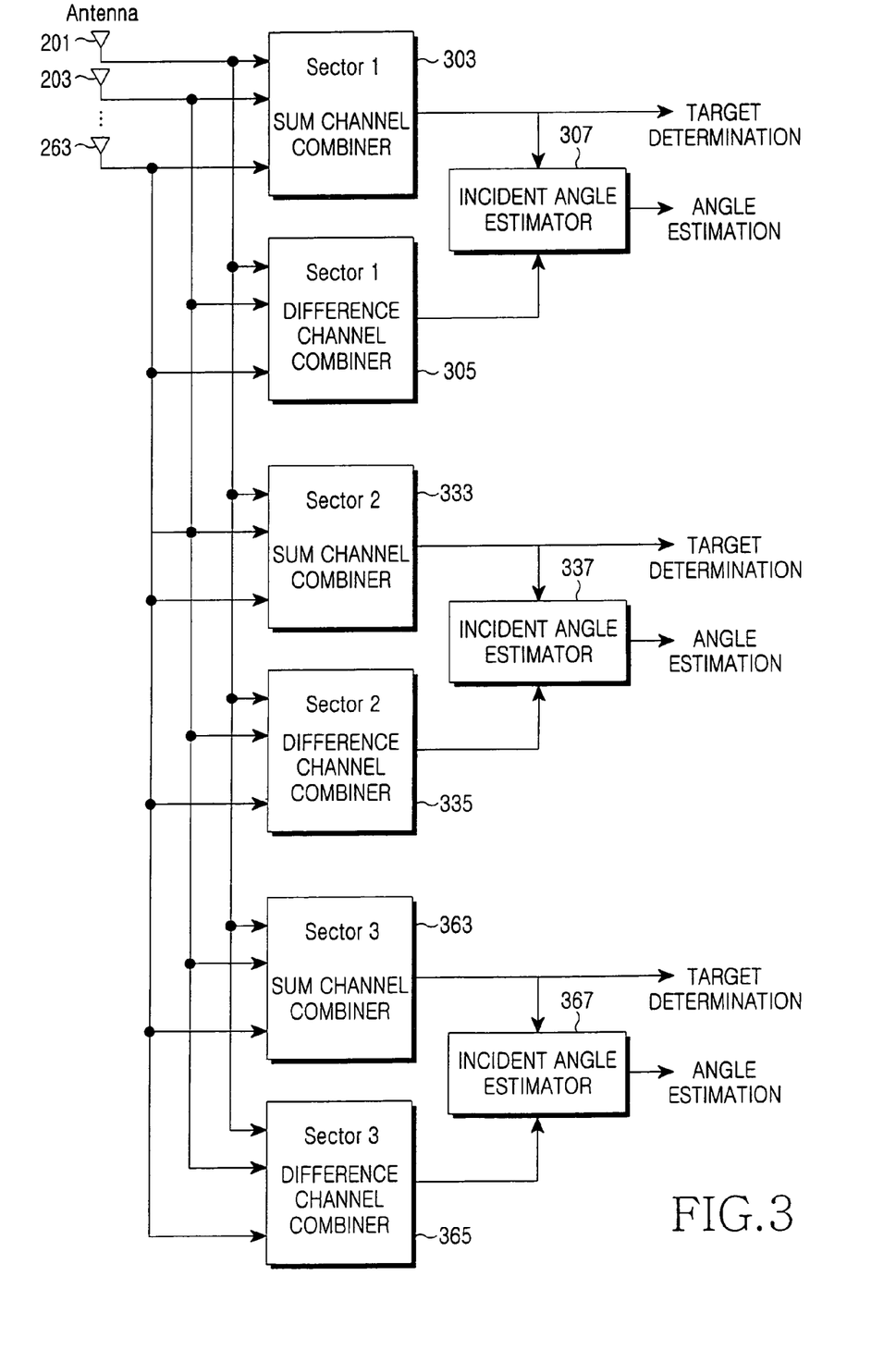
FIG. 3 is a block diagram schematically illustrating an antenna structure of a base station for estimating a direction of a mobile station by means of a mono-pulse scheme according to an embodiment of the present invention.
Figure 4:
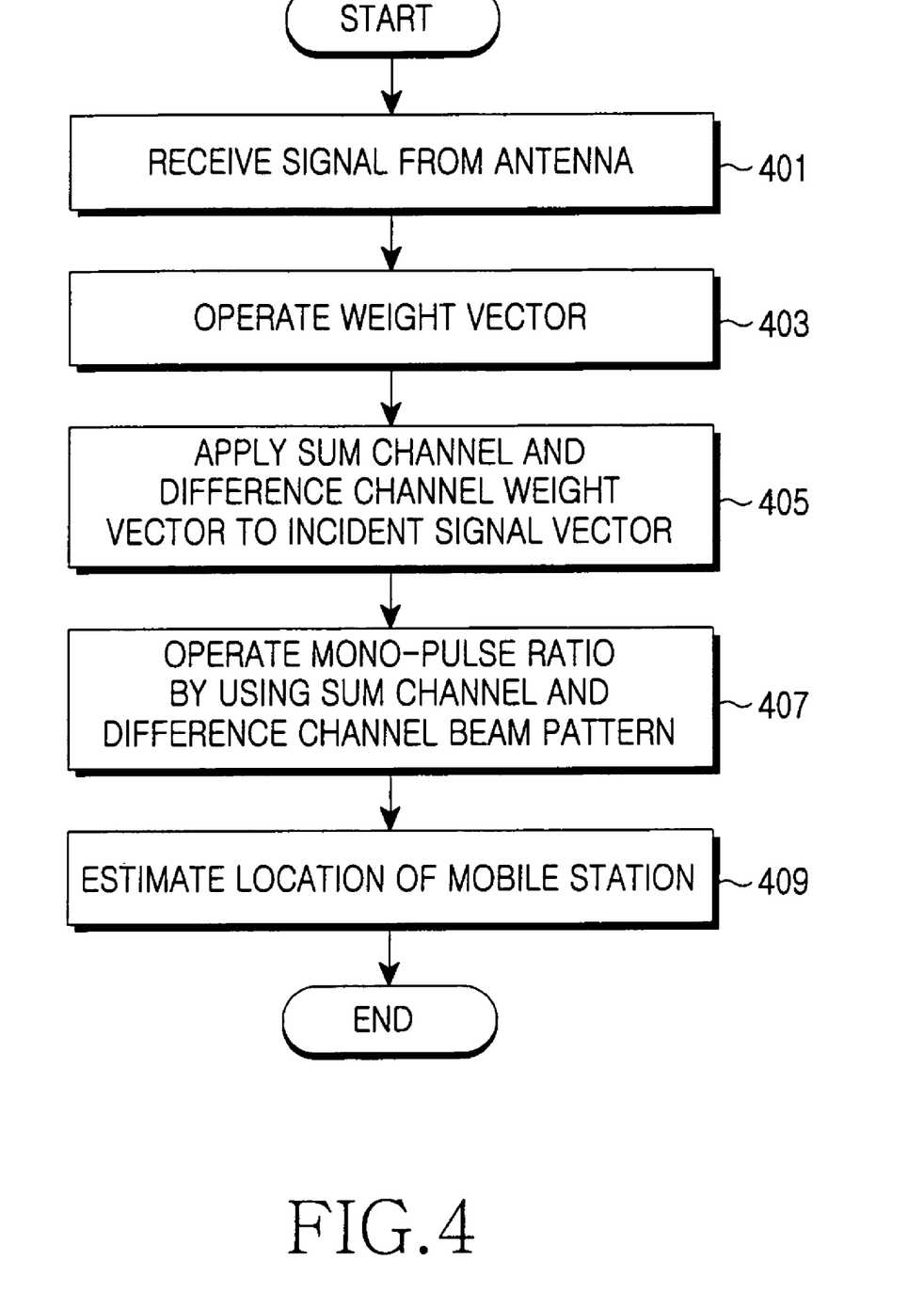
FIG. 4 is a flow chart schematically illustrating a process by which a base antenna system estimates a direction of a mobile station according to an embodiment of the present invention.

FIG. 3 is a block diagram schematically illustrating the structure of a base antenna system for estimating a direction of a mobile station by means of a mono-pulse scheme according to the present invention. FIG. 4 is a flow diagram schematically illustrating a process by which a base antenna system estimates a direction of a mobile station according to the present invention.

Referring to FIG. 3, signals received from antennas 201, 203, 231, 233, 261 and 263 are input to a sum channel combiner 303 and a difference channel combiner 305. In the sum channel combiner 303, a sum channel forms a main beam in an antenna-oriented direction, combines the signals received from the antennas 201, 203, 231, 233, 261 and 263, multiplies a result of the combination by a sum channel weight vector, and obtains a predetermined output. The output of the sum channel is used for detecting signals of a mobile station and is input to an incident angle estimator 307. The difference channel combiner 305 multiplies the signals received from the antennas 201, 203, 231, 233, 261 and 263 by a difference channel weight vector which causes a gain in an oriented direction to be zero, and obtains a predetermined output. The output of the difference channel combiner 305 is also input to an incident angle estimator 307.

After receiving the output of the sum channel combiner 303 and the difference channel combiner 305, the incident angle estimator 307 estimates an angle by means of the input values. A process by the incident angle estimator 307 estimates the angle by means of the signals, which have passed through the sum channel combiner 303 and the difference channel combiner 305 after being received in the antennas, will be described with reference to FIG. 4.

FIG. 3 describes the sum channel combiner 303, the difference channel combiner 305 and the incident angle estimator 307, which correspond to the first sector 200. Likewise, a sum channel combiner 333, a difference channel combiner 335 and an incident angle estimator 337, which correspond to the second sector 230, also detect signals from users in a sector and estimate a direction, i.e., an angle, by the same method as that for the case of the first sector 200. Further, a sum channel combiner 363, a difference channel combiner 365 and an incident angle estimator 367, which correspond to the third sector 260, also detect signals from users in a sector and estimate a direction, i.e., an angle, by the same method as that for the case of the first sector 200.

Referring to FIG. 4, the base station antenna receives $x_l$ to $x_k$ signals from k array antennas (S401). Herein, an incident signal vector X of the signals received in the array antennas corresponds to $[x_l \text{ to } x_k]^T$, wherein the T represents a transpose matrix.

Then, signal processing is performed using the input signals of the antenna and an adaptive algorithm, and sum channel and difference channel weight vectors are operated (S403), whereby the sum channel combiner and the difference channel combiner receive the input signals and operate the sum channel weight vector and the difference channel weight vector. When the sum channel combiner and the difference channel combiner do not perform the weight vector operations, a signal processor may be separately provided for the weight vector operation. Then, the sum channel combiner and the difference channel combiner may receive the weight vector from the signal processor.

hen, the sum channel combiner and the difference channel combiner operate the incident signal vector of the received signals with the sum channel and the difference channel weight vectors (S405). The outputs of the sum channel and the difference channel, to which the weight vectors have been applied, may be expressed by Equation 1:

$$u_\Sigma = w_\Sigma^H \cdot X \qquad (1)$$
$$u_\Delta = w_\Delta^H \cdot X$$

In Equation 1, $w_\Sigma$, $w_\Delta$ represent the weight vectors of the sum channel and the difference channel, respectively, and the H represents a complex transpose matrix.

Figure 5A:
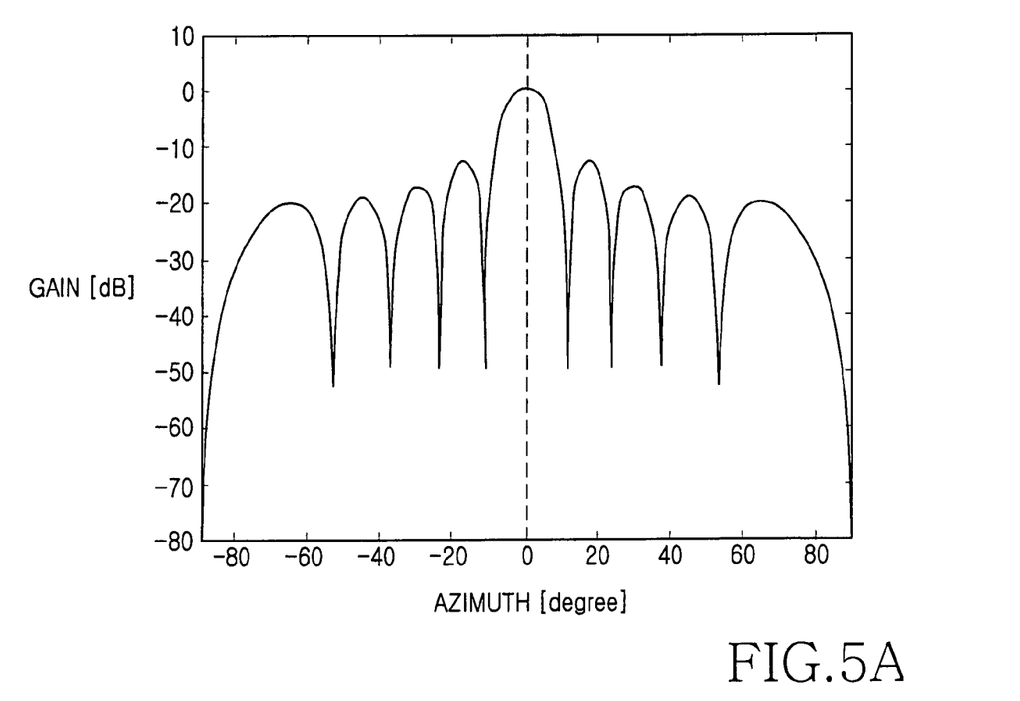
FIG. 5A is a graph schematically illustrating an antenna beam pattern of a sum channel combiner according to an embodiment of the present invention.
Figure 5B:
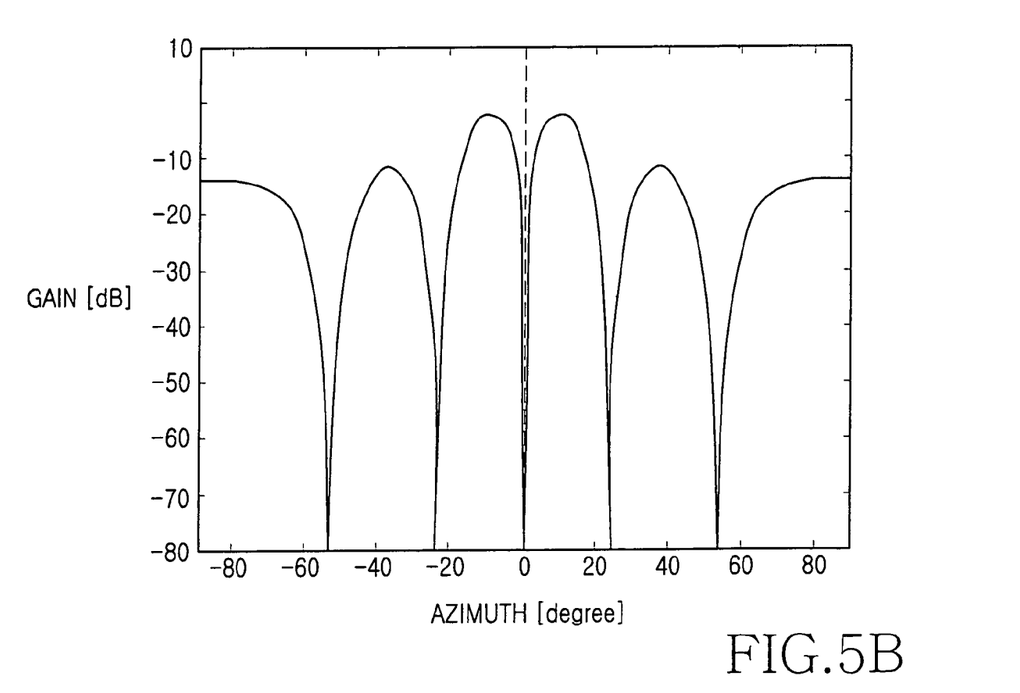
FIG. 5B is a graph schematically illustrating an antenna beam pattern of a difference channel combiner according to an embodiment of the present invention.

FIG. 5 shows the output patterns of the sum channel and the difference channel, to which the weight vectors have been applied.

FIG. 5A is a graph schematically illustrating the antenna beam pattern of the sum channel combiner according to the present invention, and FIG. 5B is a graph schematically illustrating the antenna beam pattern of the difference channel combiner according to the present invention.

In FIG. 5A, the sum channel weight vector is established in an oriented direction of an antenna array; a horizontal axis represents an azimuth angle and a vertical axis represents a gain. In FIG. 5B, the difference channel weight vector is established such that a gain in an oriented direction of an antenna array comes into zero; a horizontal axis represents an azimuth angle and a vertical axis represents a gain.

Hereinafter, the sum channel and the difference channel will be defined. The sum channel represents an output of a combiner which causes signals, which are incident from a specific direction from among signals incident into each antenna element in an array antenna, to have the same phases and sums up the signals, thereby increasing the gain of the signals incident from the specific direction. The difference channel represents an output of a combiner which adjusts phases of signals incident into each antenna element and combines the adjusted phases in order to cause signals incident from a specific direction to have a gain of zero, thereby generating destructive interference between the signals. The specific direction represents a random direction in which a mobile station may be located in a service area of a base station, i.e., a cell or sectors.

The beam patterns of the sum channel and the difference channel may be expressed by Equation 2:

$$\Sigma(\theta) = w_\Sigma^H a(\theta) \qquad (2)$$
$$\Delta(\theta) = w_\Delta^H a(\theta)$$

In Equation 2, $\alpha(\theta)$ represents an array-oriented vector of the direction which is $\theta$. In the case of an equal interval linear array, $\alpha(\theta)$ may be expressed by Equation 3:

$$\alpha(\theta) = [1, \exp(j\beta), \ldots \exp\{j(K-1)\beta\}]^T \qquad (3)$$

In Equation 3, $\beta$ represents a phase difference between antenna elements. When an interval between antenna elements is D and incident signals have a wavelength of $\lambda$, $$\beta = \frac{2\pi}{\lambda} D \sin\theta$$

is satisfied.

Further, when the direction of interest is $\theta_0$ and an antenna beam is oriented into the direction of interest, the beam patterns of the sum channel and the difference channel may be defined by Equation 4:

$$g_\Sigma(\theta - \theta_0) = w_\Sigma^H a(\theta) \quad (4)$$

$$= \sum_{k=0}^{K-1} w_\Sigma^*(k) \exp\{jk\beta\}$$

$$= \sum_{k=0}^{K-1} \exp\{jk(\beta - \beta_0)\}$$

$$= \frac{\sin\left\{\frac{K(\beta-\beta_0)}{2}\right\}}{\sin\left\{\frac{(\beta-\beta_0)}{2}\right\}} \exp\left\{j\frac{M(\beta-\beta_0)}{2}\right\}$$

$$g_\Delta(\theta - \theta_0) = \sum_{k=0}^{K-1} w_\Delta^*(k) \exp\{jk\beta\}$$

$$= \sum_{k=0}^{K/2-1} j \exp\{jk(\beta-\beta_0)\} + \sum_{k=K/2}^{K-1} (-j) \exp\{jk(\beta-\beta_0)\}$$

$$= \frac{2\sin^2\left\{\frac{K(\beta-\beta_0)}{4}\right\}}{\sin\left\{\frac{(\beta-\beta_0)}{2}\right\}} \exp\left\{j\frac{K(\beta-\beta_0)}{2}\right\}$$

In Equation 4, $\beta_0$ represents a phase difference between antenna elements of signals incident into the direction of $\theta_0$, i.e.

$$\beta_0 = \frac{2\pi}{\lambda} D \sin\theta_0.$$

It is possible to operate a mono-pulse ratio by using Equation 4 (S407). A process for computing the mono-pulse ratio may be expressed by Equation 5:

$$f(\beta - \beta_0) = \frac{g_\Sigma(\theta-\theta_0)}{g_\Delta(\theta-\theta_0)} \quad (5)$$

$$= \tan\left\{\frac{K(\beta-\beta_0)}{4}\right\}$$

$$= \tan\left\{\frac{\pi KD}{2\lambda}(\sin\theta - \sin\theta_0)\right\}$$

It is possible to estimate a location (a direction of a target) i.e. a mobile station, by using the mono-pulse ratio, the output of the sum channel and the output of the difference channel as expressed by Equation 6 (S409):

$$\hat{\theta} = f^{-1}\left\{Re\left(\frac{u_\Delta}{u_\Sigma}\right)\right\} \quad (6)$$

Information for the direction of the mobile station includes an angle for a direction in which the mobile station is located. Hereinafter, one example of estimating information for a direction of signals by the mono-pulse ratio scheme will be described with reference to FIG. 6.

Figure 6:
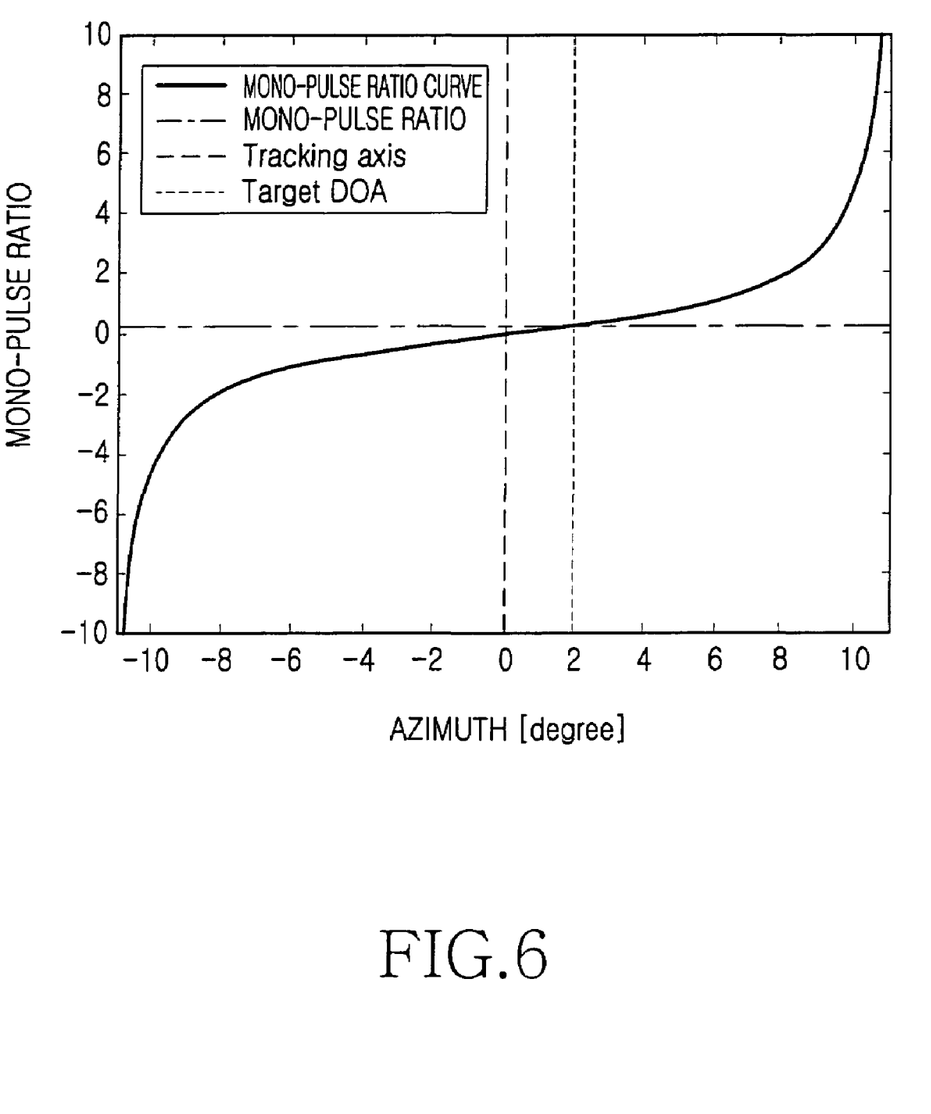
FIG. 6 is a graph schematically illustrating one example of estimating a direction of a mobile station by means of a mono-pulse ratio curve according to an embodiment of the present invention.

FIG. 6 is a graph schematically illustrating one example of estimating a direction of a mobile station by means of a mono-pulse ratio curve according to the present invention.

Referring to FIG. 6, the graph includes a vertical axis representing values of a mono-pulse ratio, a horizontal axis representing an azimuth angle, and a mono-pulse ratio curve corresponding to the mono-pulse ratio and the azimuth angle. In the mono-pulse ratio curve, the mono-pulse ratio corresponds to the azimuth. In the mono-pulse ratio curve, it is possible to estimate direction information of the mobile station, i.e. a target Direction Of Arrival (DOA), which is parallel with a tracking axis based on the mono-pulse ratio. Accordingly, the incident angle estimator receives the output signals of the sum channel combiner and the difference channel combiner, to which weights have been applied, and performs the afore-described operations using the mono-pulse ratio. As a result, an angle (i.e. a direction) of mobile station signals is estimated by using the output signals of the sum channel combiner and the difference channel combiner, and the mono-pulse ratio.

Figure 7:
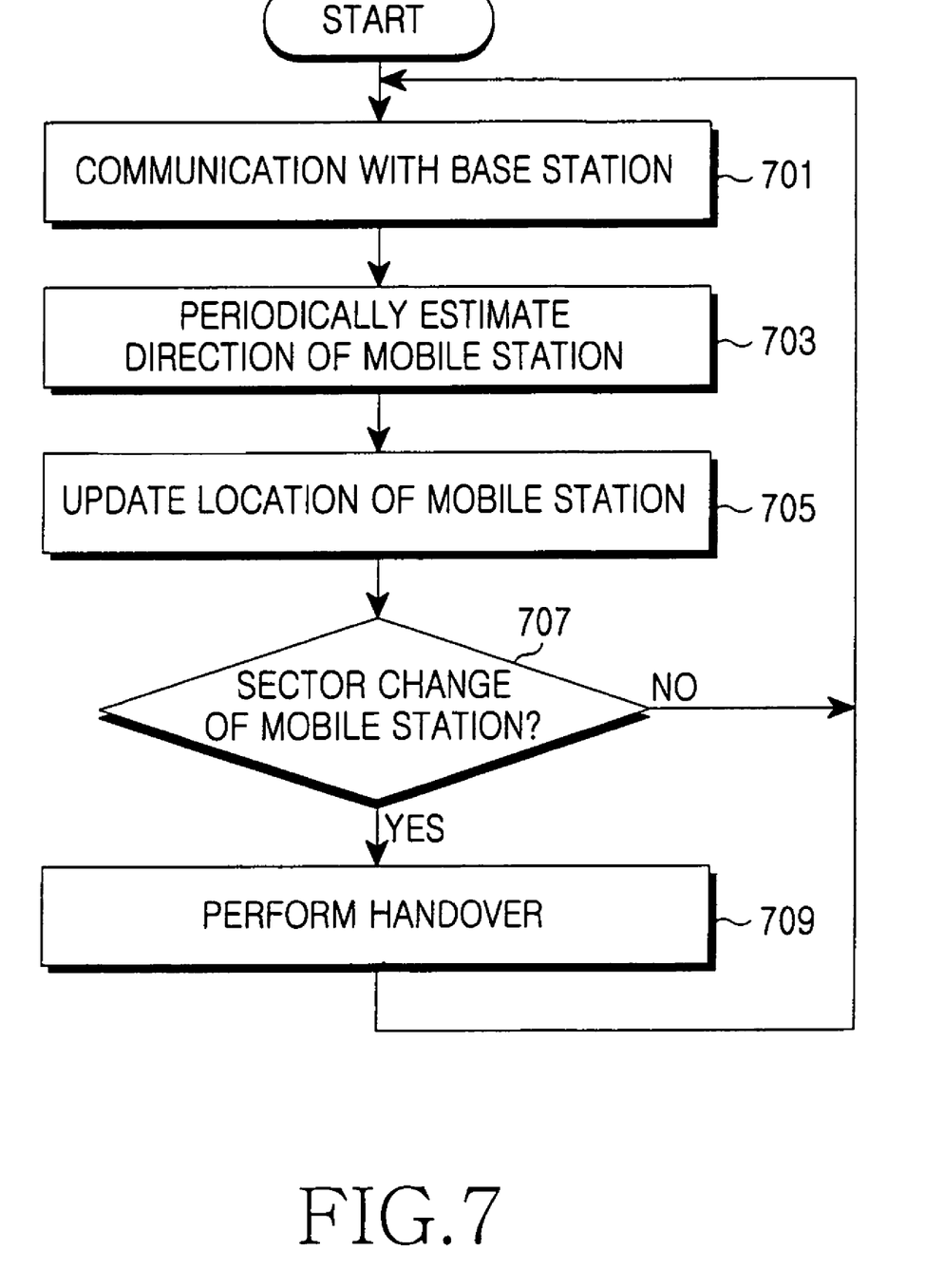
FIG. 7 is a flow chart schematically illustrating an operation of an antenna system for estimating a direction of mobile station signals and performing handover according to an embodiment of the present invention.

FIG. 7 is a flow diagram schematically illustrating an operation of an antenna system for estimating a direction of mobile station signals and performing handover according to the present invention.

Referring to FIG. 7, in the base station antenna system to which the mono-pulse scheme for direction estimation has been applied, a service area (i.e. a cell) of a base station is divided into a plurality of sectors. When a mobile station is located in the service area (i.e. the cell) of a base station, the mobile station communicates with the base station (S701). Herein, the base station selects a sector, in which communication is to be performed, through a general procedure with the mobile station, and communicates with the mobile station in the sector. While communicating with the mobile station, the base station periodically estimates the direction of the mobile station by means of the apparatus and the method illustrated in FIGS. 3 and 4 with reference to the output of the sum channel, the output of the difference channel, and the mono-pulse ratio (S703). Then, the base station updates the location of the mobile station by means of information for the estimated direction (S705). Further, the base station determines if it is necessary to change a sector in which the base station communicates with the mobile station having the updated location, i.e. determines if handover is necessary (S707). As a result of the determination, when it is not necessary to change the sector, the base station continues to communicate with the mobile station through the existing sector (S701). However, when it is necessary to change the sector, the base station changes the sector, thereby performing inter-sector handover (S709). Accordingly, when the mobile station moves and changes its own location, the base station can perform handover by means of the estimated direction information of the mobile station even without exchanging separate information with the mobile station.

When the base station performs handover by means of the location information as described in FIG. 7, the base station determines if a sector including the mobile station has changed by means of the location information without exchanging handover information necessary for an existing handover process between a base station and a mobile station, thereby performing the handover at high speed.

Hereinafter, the structure and the operation process of a base station for receiving the antenna signals and performing adaptive beam forming will be described with reference to FIGS. 8 and 9.

Figure 8:
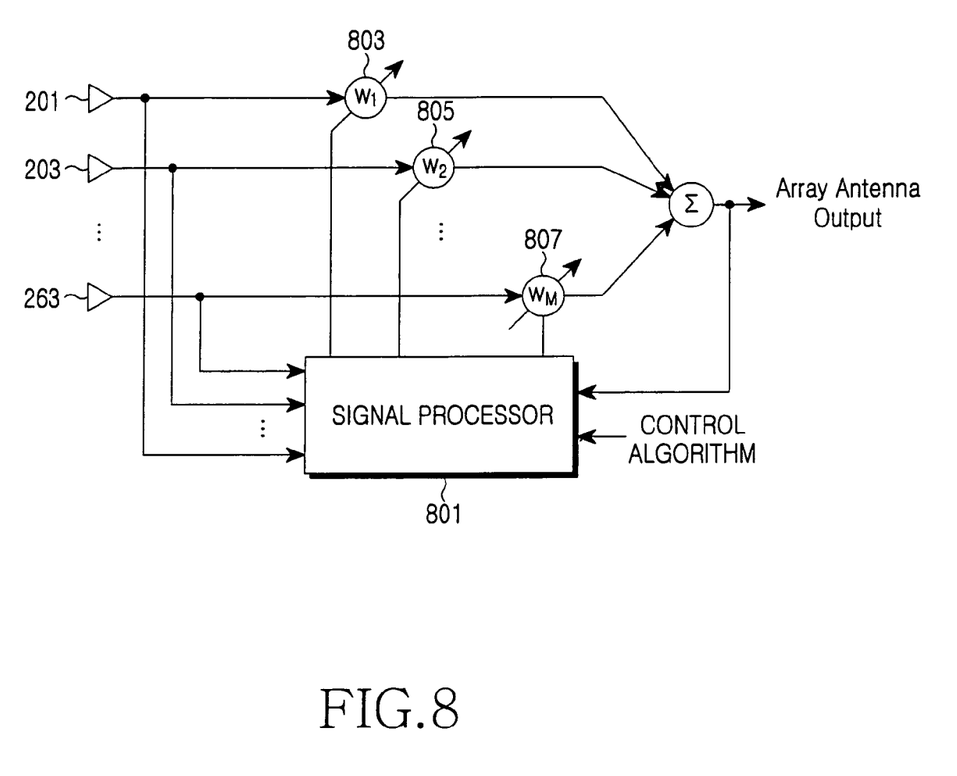
FIG. 8 illustrates a structure of a base station for adaptively adjusting beam-forming according to an embodiment of the present invention.

FIG. 8 is a diagram schematically illustrating the structure of the base station for adaptively adjusting beam forming according to the embodiment of the present invention. FIG. 9 is a flow diagram schematically illustrating the operation process of the base station for adaptively adjusting the beam forming according to the embodiment of the present invention.

Figure 9:
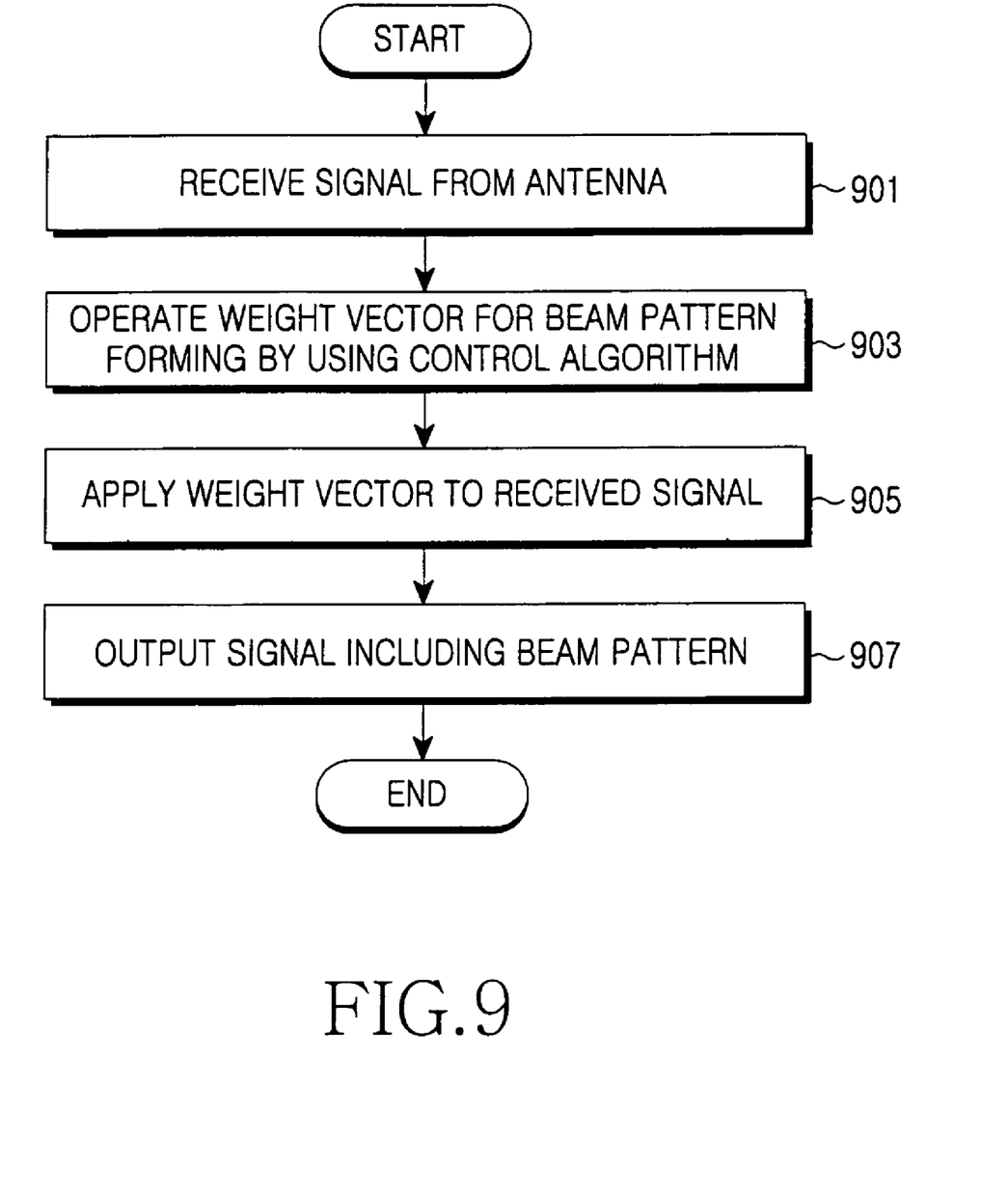
FIG. 9 is a flow chart schematically illustrating an operation process of a base station for adaptively adjusting beam forming according to an embodiment of the present invention.

Referring to FIGS. 8 and 9, the base station uses a circular array antenna employing a mono-pulse scheme and receives signals from the antennas 201 and 203, 231, 233, 261 and 263 (S901). The signals received from the antennas are input to a signal processor 801. The signal processor 801 operates weight vectors for beam pattern forming by means of a control algorithm, e.g. an adaptive algorithm, etc., (S903). Then, the base station applies the weight vectors to the received signals by means of the phase converters 803, 805 and 807, respectively, (S905). The signal processor 801 may separately operate as illustrated in FIG. 8, or may perform the operation including the operation of the weight vector for the beam-forming, and the operations of the sum channel weight vector and the operation of the difference channel weight vector as illustrated in FIG. 3. Further, it is also possible to input the sum channel weight vector and the difference channel weight vector to the sum channel combiner and the difference channel combiner, respectively. FIG. 8 illustrates the weight vectors (i.e. $\omega_1, \omega_2, \ldots, \omega_M$) multiplied by the phase converters 803, 805 and 807. Accordingly, when the weight vectors are applied, the direction of interest is $\theta_0$ and an antenna beam is oriented into the direction of interest, the beam patterns of the sum channel and the difference channel may be expressed by Equation 4. Then, the base station outputs signals including the beam patterns (S907). The output signals are input to the signal processor 801, and are applied for generating weight vectors for the beam forming.

As a result, in the circular array antenna, a phase difference between antenna elements are compensated by using a phase converter, so that signals incident into a specific direction have an increased output.

According to the present invention as described above, a wireless communication system includes a base station antenna of a circular array structure, and applies a mono-pulse scheme to the base station antenna, so that it is possible to estimate the location of a user. Accordingly, it is possible to perform inter-sector handover of a base station at high speed by means of location estimation information of the user without separate exchange of data for handover. Further, the location of the user is estimated and phases of signals output from each antenna element are shifted, so that it is possible to generate a directional antenna beam suitable for each sector. Furthermore, the wireless communication system can be used for a location information service, etc., by means of the direction of the user. Moreover, the circular array antenna is used, so that the physical size of an existing antenna system used in a base station can be reduced.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A base station antenna system for dividing a cell of a base station into at least one sector, providing a communication service to a mobile station in the cell, and estimating a direction of the mobile station in a wireless communication system, the base station antenna system comprising:
   at least two antennas with a circular array structure for receiving signals from the mobile station, each of the antennas employing a mono-pulse scheme;
   a sum channel combiner for generating sum channel weight vectors in order to increase a gain of signals incident to a specific direction, applying the sum channel weight vectors to the signals received from the antennas, and outputting predetermined signals;
   a difference channel combiner for generating difference channel weight vectors in order to cause a gain of signals incident to a specific direction to be zero, applying the difference channel weight vectors to the signals received from the antennas, and outputting predetermined signals; and
   an incident angle estimator for obtaining beam patterns of a sum channel and a difference channel by means of a direction of interest, calculating a mono-pulse ratio by means of the beam patterns, and estimating the direction of the mobile station by means of the mono-pulse ratio, output of the sum channel combiner, and output of the difference channel combiner.

2. The base station antenna system as claimed in claim 1, wherein the specific direction includes a random direction in which the mobile station may be located in the cell of the base station.

3. The base station antenna system as claimed in claim 1, wherein the direction of interest includes a direction for orienting an antenna beam.

4. The base station antenna system as claimed in claim 1, further comprising:
   a signal processor for computing weight vectors for beam pattern forming by means of a predetermined control algorithm after receiving the signals from the antennas; and
   a phase processor for applying the weight vectors for the beam pattern forming to the signals received from the antennas, and outputting predetermined signals.

5. The base station antenna system as claimed in claim 4, wherein the signal processor performs operations of the sum channel weight vectors, the difference channel weight vectors, and the weight vectors for the beam pattern forming.

6. The base station antenna system as claimed in claim 4, wherein the signal processor receives signals output from the phase processor, and operates the weight vectors for the beam pattern forming by means of the received signals.

7. The base station antenna system as claimed in claim 4, wherein the control algorithm includes an adaptive algorithm.

8. An operation method of a base station antenna system for dividing a cell of a base station into at least one sector, providing a communication service to a mobile station in the cell, and estimating a direction of the mobile station in a wireless communication system, the operation method comprising the steps of:
   receiving signals from at least two antennas to which a mono-pulse scheme has been applied;
   operating sum channel weight vectors for increasing a gain of signals incident to a specific direction and difference channel weight vectors for causing a gain of signals incident to a specific direction to be zero;
   applying the sum channel weight vectors and the difference channel weight vectors to the received signals, and outputting predetermined signals; and
   obtaining beam patterns of a sum channel and a difference channel, to which the weight vectors have been applied, by means of a direction of interest, calculating a mono-pulse ratio by means of the beam patterns, and estimating the direction of the mobile station by means of the mono-pulse ratio, and output of the sum channel and output of the difference channel to which the weight vectors have been applied.

9. The operation method as claimed in claim 8, wherein the specific direction includes a random direction in which the mobile station may be located in the cell of the base station.

10. The operation method as claimed in claim 8, wherein the direction of interest includes a direction for orienting an antenna beam.

11. The operation method as claimed in claim 8, further comprising:
    communicating with the mobile station using the base station antenna, and periodically estimating the direction of the mobile station by means of the mono-pulse ratio, and output of the sum channel and output of the difference channel to which the weight vectors have been applied;
    updating a location of the mobile station and determining if a sector in which the base station communicates with the mobile station has changed; and
    controlling inter-sector handover when it is necessary to change the sector in which the base station communicates with the mobile station.

12. The operation method as claimed in claim 8, further comprising:
    computing weight vectors for beam pattern forming by means of a predetermined control algorithm after receiving the signals from the antennas; and
    applying the weight vectors for the beam pattern forming to the signals received from the antennas, and outputting predetermined signals.

13. The operation method as claimed in claim 12, wherein the step of computing the weight vectors for the beam pattern forming further comprises receiving the output signals, and operating the weight vectors by means of the received signals.

14. The operation method as claimed in claim 12, wherein the control algorithm includes an adaptive algorithm.

* * * * *